US 6,612,640 B2

(12) United States Patent
Hock et al.

(10) Patent No.: US 6,612,640 B2
(45) Date of Patent: Sep. 2, 2003

(54) VEHICULAR INTERIOR SPACE MODULE

(75) Inventors: Daniel Hock, Johannesberg (DE); Arnulf Zinsmeister, Todtnau (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/214,347

(22) Filed: Aug. 7, 2002

(65) Prior Publication Data

US 2003/0030298 A1 Feb. 13, 2003

(30) Foreign Application Priority Data

Aug. 10, 2001 (DE) .................................. 201 13 304 U

(51) Int. Cl.[7] .................... B60J 5/04; B60R 13/02; H01R 33/00
(52) U.S. Cl. .................. 296/146.7; 296/1.1; 296/39.1; 296/214; 439/34
(58) Field of Search .................... 296/146.7, 39.1, 296/39.3, 191, 152, 210, 211, 214, 24.1, 37.3, 37.13, 1.1; 439/34, 36

(56) References Cited

U.S. PATENT DOCUMENTS

| 3,852,585 | A |   | 12/1974 | Brunger |   |
|---|---|---|---|---|---|
| 4,255,005 | A | * | 3/1981 | Fukunaga | 439/65 |
| 5,154,481 | A | * | 10/1992 | Paetz et al. | 296/211 |
| 5,154,617 | A | * | 10/1992 | Suman et al. | 439/34 |
| 5,662,491 | A | * | 9/1997 | Antilla et al. | 439/342 |
| 5,825,096 | A | * | 10/1998 | Morimoto et al. | 307/9.1 |
| 5,931,682 | A | * | 8/1999 | Takiguchi et al. | 296/146.7 |
| 5,993,247 | A | * | 11/1999 | Kidd | 439/495 |
| 6,036,501 | A | * | 3/2000 | Wojewnik et al. | 439/34 |
| 6,159,030 | A | * | 12/2000 | Gawron et al. | 439/247 |
| 6,273,499 | B1 |   | 8/2001 | Guyon |   |
| 6,318,797 | B1 |   | 11/2001 | Becher |   |
| 6,354,843 | B1 | * | 3/2002 | Kato | 439/34 |
| 6,371,548 | B1 | * | 4/2002 | Misaras | 296/146.7 |
| 6,513,959 | B2 | * | 2/2003 | Serizawa et al. | 296/214 |
| 2001/0005083 | A1 |   | 6/2001 | Yamagushi |   |

FOREIGN PATENT DOCUMENTS

| DE | 35 29 660 A1 | 2/1986 |
| DE | 3820845 | 2/1989 |
| DE | 196 53 431 A1 | 7/1997 |
| DE | 19653431 | 7/1997 |
| DE | 29706751 | 12/1997 |
| DE | 19951659 | 5/2001 |
| DE | 10061866 | 7/2001 |
| EP | 0872384 | 10/1998 |
| EP | 1038731 | 9/2000 |

* cited by examiner

Primary Examiner—D. Glenn Dayoan
Assistant Examiner—G Blankenship
(74) Attorney, Agent, or Firm—Carlson, Gaskey & Olds

(57) ABSTRACT

A vehicular interior space module comprises an interior space lining part that has a large surface area and is visible from inside in a state when installed in a vehicle, the interior space lining part including an opening. The module further comprises an insert which is located in the opening and fastened to the interior space lining part, the insert having an outer housing in which at least one electrical component is arranged. At least one exposed electrical contact surface area is provided on the interior space lining part arranged directly on an edge of the opening, the insert having a fastener for attaching the insert to the interior space lining part. The fastener includes a cooperating contact configured such that the contact surface area contacts the cooperating contact in an electrically conductive manner through fastening the insert in the opening.

17 Claims, 1 Drawing Sheet

VEHICULAR INTERIOR SPACE MODULE

BACKGROUND OF THE INVENTION

This application claims priority to German patent application number 201 13 304.0 filed Aug. 10, 2001. The invention relates to a vehicular interior space module.

Such a vehicular interior space module is, for example, the roof liner module of a vehicle, in which the interior space lining part, having a large surface area, covers the roof on the inside. A further vehicular interior space module is, for example, the door lining together with components coupled thereto. Preferably, electrical or electronic components that are secured to the lining part which in most cases is made of plastics or compressed fiber elements, are lighting devices, switches or a microphone or loudspeaker, for instance for the telephone. During installation, the electrical component is inserted into the opening preferably so as to terminate flush with the lining part on the visible inner side. Providing electrical contact with the cable harness of the vehicle is effected by means of plugs which are expensive in production and require excessive cable lengths, in order to make possible an appropriate installation and removing of the insert. The excessive lengths, in turn, require suitable measures in order to avoid rattling noises.

A cable harness fastening device is known from DE 35 29 660 A1. In this arrangement, a so-called inner side panel having a large surface area is arranged between the raw door structure and the interior space lining; provided in this inner side panel are cables and plugs on cable ends, which all are embedded in the panel by foaming. Additional fasteners are provided to fasten the side panel and the interior space lining to the door frame. During fastening, the plugs embedded in foam will enter in counter plugs on the raw door structure and on the interior space lining in order to make contact. The positioning of the fasteners and of the plugs relative to each other has to be extremely accurate, otherwise plugs and fasteners spaced therefrom can not contact the associated plugs and fasteners on the other part during installation.

From DE 196 53 431 A1 there is known a roof module in which an interior space lining part having a large surface area is provided namely the roof liner. Between the interior space lining and the roof itself, there is arranged a mounting plate which is not visible in the installed state of the module. This mounting plate contains an antenna and a modular circuit block. A reading lamp is inserted e.g. from the rear side into an opening in the mounting plate, i.e. from that side of the mounting plate that faces away from the interior space lining part, and is fixed to the mounting plate. A cover for the lamp is then placed on from the side of the interior space lining part. In addition, an illuminated vanity mirror in the sun visor as well as a rear mirror may be fastened to the mounting plate, even here an expensive plug connector being provided which has to have a defined distance to the mounts for the vanity mirror and the rear mirror, so that during installation of sun visor and rear mirror the plug contacts actually come into contact with each other. The mounting plate and the roof liner are fastened to each other in that a protruding housing which is provided on the rear side of the roof liner is put through an opening in the mounting plate. A counter housing on the mounting plate is provided with contacts and is provided with a swivel bracket coupled with the contacts. The swivel bracket is shifted parallel to the plane of the plate, and the contacts likewise are guided in this plane into the housing on the rear side of the roof liner. The positioning of the parts to each other has to be very accurate, so that the contact pins enter into the openings in the housing on the rear side of the roof liner. Moreover, designing the two housing parts with the shiftable contacts is very complicated and expensive.

It is the object of the invention to provide a vehicular interior space module in which the insert can be fastened to the lining part very easily and quickly, and which nevertheless can be produced at favorable costs. In addition, there should be available an easy option for replacing in the case of servicing.

SUMMARY OF THE INVENTION

According to the invention, a vehicular interior space module comprises an interior space lining part that has a large surface area and is visible from inside in a state when installed in a vehicle, the interior space lining part including an opening. The module further comprises an insert which is located in the opening and fastened to the interior space lining part, the insert having an outer housing in which at least one electrical component is arranged. At least one exposed electrical contact surface area is provided on the interior space lining part directly on an edge of the opening, the insert having a device for fastening the insert to the interior space lining part. The device includes a cooperating contact configured such that the contact surface area contacts the cooperating contact in an electrically conductive manner through fastening the insert in the opening. It is in this way that a current flow to and away from the component can be established. In the module according to the invention, there will be made—simultaneously with and by means of the fastening of the insert to the lining part—the electrical contact between a contact surface area on the side of the lining part and the cooperating contact on the insert, so that expensive plugs are not required any longer and also a separate assembling of wire connections will not occur. Due to the fact that the contact surface area is provided directly on the edge and is exposed, an expensive accommodation in a costly housing is not provided. Thus, the device for fastening can directly engage the edge for firmly securing the insert, and the device for fastening serves simultaneously for making electrical contact. The engineering of the device for fastening can be configured to be very simple, because the contact surface area is exposed to the exterior, as already mentioned. Further, larger contact surface areas allow a simple compensation of tolerances.

Preferably, the contact surface area is exposed on the rear side of the interior space lining part facing away from a vehicle interior space and/or on the inner side limiting the opening, and is provided on the rear side or the inner side, i.e. is fastened to the edge of the opening.

There is further provided not only one contact surface area, but so many contact surface areas that the component is connected to the power source and to ground only through these contact surface areas.

The interior space lining part preferably consists of an electrically insulating material.

According to the preferred embodiment, fastening the insert is effected by means of a latching connection, i.e. preferably a connection which does not require any additional fasteners such as screws or the like, with the result of shorter installation times.

In this context, the latching device also serves for making electrical contact, by the contact surface area or the cooperating contact being provided on it.

One embodiment makes provision that the insert has an elastic latching spring that projects outwards transversely to a direction of insertion and forms the cooperating contact.

The latching spring may be configured such that, when the insert is in the installed state, it clamps the edge between it and a protruding collar of the insert. It is due to this clamping action that rattling noises can be safely prevented.

The edge is preferably formed by a reinforcement frame which allows an improved fit of the insert as well as a multiple replacing of the insert, without the edge being severely worn and without having a detrimental effect on the quality of the fastening.

Provided on the reinforcement frame, that preferably is made of an electrically non-conductive material, is the contact surface area, so that no additional, expensive measures have to be made on the remainder of the large-surface lining part in order to make available the contact surface area.

Together with the contact surface area, the reinforcement frame may form a prefabricated part which is fastened to the remainder of the interior space lining part, for instance by foaming, gluing or clipping on.

If the contact surface area is formed by a metal strip, fastened to which is a cable of a cable harness of the vehicle in a plug-free manner, then a further connection through plugs can be dispensed with. Other types of making contact are employed, such as screwing, riveting, welding or brazing. As an alternative, it is possible, of course, that a cable, a conductor track or a printed circuit board leads to the metal strip, with the cable being contacted with the metal strip already at the supplier of the module, so that after the actual installation of the module in the vehicle the other, free cable end is connected to the cable harness.

For the purpose of replacing it, the insert is detachably fastened to the edge.

The insert preferably projects through the opening, so that the insert protrudes into the interior space.

DETAILED DESCRIPTION OF PREFERRED EMBODIMENTS

Figure 1:
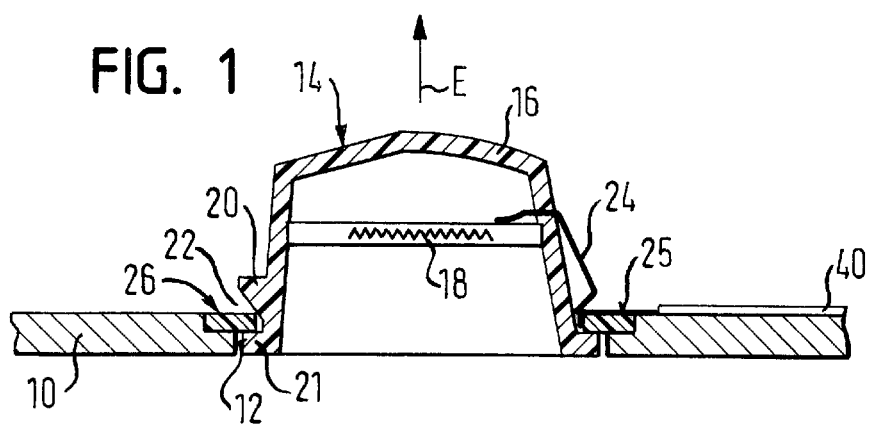
FIG. 1 shows a sectional view through a section of a vehicular interior space module according to the invention, in the form of a roof liner module.
Figure 2:
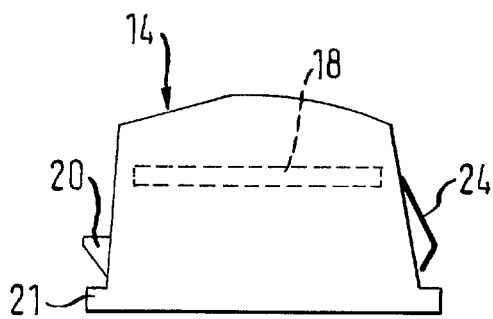
FIG. 2 shows a side view of the insert as illustrated in FIG. 1.

In FIG. 1 there is illustrated a vehicular interior space module in the form of a roof liner module, comprising an interior space lining part 10 that has a large surface area and is made of electrically insulating material, preferably of compressed fiber materials having a decorative material facing the interior space. Alternatively, the shown module is for covering a door's interior. The interior space lining part has at least one opening 12; inserted into this opening is an insert 14 which is fastened to the interior space lining part 10. The insert 14, which projects through the opening 12, has a bell-shaped outer housing 16 of an electrically insulating material, into which housing an electrical component 18, e.g. a lighting device, a switch, a microphone or a loudspeaker is integrated. For the sake of simplification, the electrical component 18 as shown in FIG. 1 is a sort of bridge between opposing side walls of the outer housing 16.

The insert 14 is connected with the interior space lining part 10 through a fastener in the form of a latching connection. To this end, there are provided on the left-hand side wall of FIG. 1 projecting retaining noses 20 on the outer housing 16, which form a receptacle 22 between them and a protruding collar 21. On the opposite side of the outer housing 16, there are arranged three latching springs 24 which are made of spring steel and, therefore, are electrically conductive. The latching springs, forming latching devices, have sections which transversely to the direction of insertion E of the insert 14 project laterally outwards, which sections move inwardly during inserting in the direction E and snap outwards as soon as they have slid along the interior space lining part 10. The interior space lining part 10 and the insert 14 are of such design that said insert 14 is only to be inserted into said opening from said inner side. The collar 21 excludes insertion from the rear side.

The latching springs 24 are all configured the same and lie one behind the other; they are firmly connected with the outer housing 16 and serve, in addition, for making electrical contact with the electrical component 18 or more of the electrical components provided in the insert 14.

The edge of the opening 12 defines an annularly closed reinforcement frame 26 of plastics, which on the outside terminates flush with the remainder of the interior space lining part 10, namely the large-area part of fiber materials; this frame, however, forms an assembly unit with the large-surface area part of fiber materials, namely the interior space lining part 10. As an alternative, the reinforcement frame may also consist of several segments of conductive material which are insulated with respect to each other, the top surface of which constitutes the contact surface area. The segments are referenced by reference numeral 132.

The frame 26 is a separate, prefabricated part which is either connected with the remainder of the interior space lining part 10 by clipping or gluing or which during producing the interior space lining part 10 is placed in a foaming mold and is embedded in foam. On the rear side of the reinforcement frame 26, there are fastened several metal strips 28 which are exposed on their rear side and which are insulated from each other. The metal strips 28 have a long section 32 extending parallel to the inner side 30 of the reinforcement frame, as well as a section 34 perpendicular thereto and having a free end which protrudes laterally with respect to the frame 26. As an alternative, the contact surface areas may also be formed by conductor tracks which are applied onto the rear side of the lining part by means of printing or gluing.

Associated to each metal strip 28 is a latching spring 24 which in the latched state according to FIG. 1 contacts the upper side (which is termed contact surface area 25) of the metal strip 28, so that an electrical contact occurs automatically during installation, by the fasteners being configured at the same time as current-carrying device. The elastic latching springs form a cooperating contact to the exposed contact surface area 25, at which they rest in the fastened state, and they clamp the edge between themselves and the collar 21.

Figure 4:
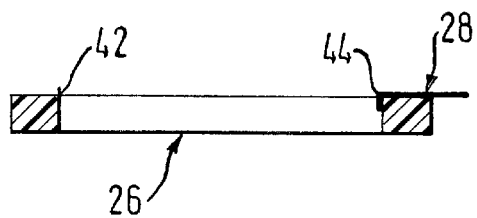
FIG. 4 shows a section through the reinforcement frame according to line IV—IV in FIG. 3.

For securing, and as illustrated in FIG. 4, the metal strip 28 may be bent off around the edge 42 towards the inner side of the opening 12, or, in other words, can be angled so as to extend into the opening 12, so that the contact to the associated latching spring 24 may also occur at the resulting edge 44.

Provided on the free, projecting ends of the sections 34 are cables 40 without provision of a plug, e.g. by screwing, riveting, welding or brazing.

The insert 14 is detachably fastened to the frame 26, for instance in order to replace a defect electrical component 18.

As can be seen, it is not necessary—both for establishing an electrical contact and for interrupting an electrical contact during demounting—to detach cables or the like from each other; rather, it is through the fastening process that the electrical contact is produced automatically, or, when the fastening is loosened again, is interrupted again.

Figure 3:
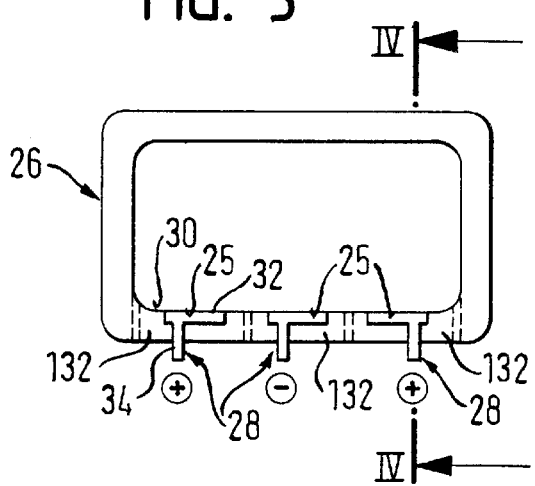
FIG. 3 shows a top view onto a reinforcement frame illustrated in FIG. 1.

The electrical component 18 is integrated in the one or more current circuits exclusively by means of the metal strips 28 provided in a sufficient number, and is connected to the power source (+) and to ground (−) (see FIG. 3).

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicular interior space module, comprising:
   an interior space lining part including an opening;
   an insert located in said opening and fastened to said interior space lining part, said insert having an outer housing in which at least one electrical component is arranged and a device for fastening said insert to said interior space lining part;
   at least one exposed electrical contact surface area on said interior space lining part arranged on an edge of said opening; and
   said device including a cooperating contact configured such that said contact surface area contacts said cooperating contact in an electrically conductive manner through fastening said insert in said opening.

2. The vehicular interior space module according to claim 1, wherein said contact surface area is exposed on at least one of a rear side of said interior space lining part facing away from a vehicle interior space and an inner side limiting said opening, and wherein said contact surface area is provided on said rear side and said inner side, respectively.

3. The vehicular interior space module according to claim 1, wherein said at least one electrical component is connected to a power source and to ground through said at least one electrical contact surface area.

4. The vehicular interior space module according to claim 1, wherein a latching connection is provided for fastening said insert.

5. The vehicular interior space module according to claim 4, wherein at least one latching device is provided that includes one of said contact surface area and said cooperating contact.

6. The vehicular interior space module according to claim 5, wherein said insert has an elastic latching spring that projects outwards and transversely to a direction of insertion and forms said cooperating contact.

7. The vehicular interior space module according to claim 6, wherein said latching spring is configured such that, when said insert is in an installed state, said latching spring clamps said edge between said latching spring and a protruding collar of said insert.

8. The vehicular interior space module according to claim 1, wherein said edge is formed by a reinforcement frame on which said contact surface area is provided.

9. The vehicular interior space module according to claim 8, wherein said reinforcement frame has at least one electrically conductive section of a conductive material, an outer surface of said section forming said contact surface area.

10. The vehicular interior space module according to claim 8, wherein said reinforcement frame together with said contact surface area forms a prefabricated part which is fastened to a remainder of said interior space lining part.

11. The vehicular interior space module according to claim 10, wherein said reinforcement frame is fastened to said remainder of said interior space lining part by one of foaming, gluing and clipping.

12. The vehicular interior space module according to claim 1, wherein a cable of a cable harness of a vehicle is provided and wherein said contact surface area is formed by a metal strip to which said cable of said cable harness is fastened.

13. The vehicular interior space module according to claim 1, wherein said insert is detachably fastened to said edge.

14. The vehicular interior space module according to claim 1, wherein said module is one of a roof liner module and a module for covering a door's interior space.

15. The vehicular interior space module according to claim 1, wherein said electrical component is one of a lighting device, a switch, a microphone and a loudspeaker.

16. The vehicular interior space module according to claim 1, wherein said insert projects through said opening.

17. The vehicular interior space module according to claim 1, wherein said interior space lining part has an inner side facing an interior space, and wherein said insert is inserted into said opening from said inner side.

* * * * *

UNITED STATES PATENT AND TRADEMARK OFFICE
CERTIFICATE OF CORRECTION

PATENT NO.   : 6,612,640 B2  Page 1 of 1
DATED        : September 2, 2003
INVENTOR(S)  : Daniel Hock and Arnulf Zinsmeister It is certified that error appears in the above-identified patent and that said Letters Patent is hereby corrected as shown below:

Column 6,
Line 6, "claim 5" should be -- claim 3 --.

Signed and Sealed this

Ninth Day of December, 2003

JAMES E. ROGAN
*Director of the United States Patent and Trademark Office*